United States Patent [19]

Loken

[11] Patent Number: 5,207,181
[45] Date of Patent: * May 4, 1993

[54] BIRD FEEDER

[76] Inventor: Selmer M. Loken, 1270 Wild Ridge Trail, Newport, Minn. 55055

[*] Notice: The portion of the term of this patent subsequent to Apr. 21, 2009 has been disclaimed.

[21] Appl. No.: 886,038

[22] Filed: May 19, 1992

Related U.S. Application Data

[63] Continuation-in-part of Ser. No. 780,152, Oct. 21, 1991, which is a continuation-in-part of Ser. No. 718,963, Jun. 21, 1991, Pat. No. 5,105,765.

[51] Int. Cl.$^5$ .............................................. A01K 39/00
[52] U.S. Cl. ................................... 119/57.9; 119/52.3
[58] Field of Search ............... 119/52.2, 52.3, 57.8, 119/57.9

[56] References Cited

U.S. PATENT DOCUMENTS

| | | | |
|---|---|---|---|
| D. 231,369 | 4/1974 | Kilham | D30/14 |
| 2,230,058 | 1/1941 | Hornung | 119/52.3 |
| 2,677,816 | 5/1954 | Quist | 340/244 |
| 2,931,336 | 5/1990 | Cather | 119/52.3 |
| 2,965,070 | 12/1960 | Myrick | 119/51 |
| 3,253,576 | 5/1966 | Tvedten | 119/51 |
| 3,568,641 | 3/1971 | Kilham | 119/51 |
| 3,653,361 | 4/1972 | Holliday | 119/52 AF |
| 4,188,913 | 2/1980 | Earl | 119/51 R |
| 4,327,669 | 2/1980 | Blasbalg | 119/51 R |
| 4,328,765 | 5/1982 | Kilham | 119/51.8 |
| 4,441,457 | 4/1984 | Sanford | 119/51 R |
| 4,498,423 | 2/1985 | Gainsboro | 119/51 R |
| 4,541,302 | 9/1985 | Dehls | 119/51 R |
| 4,646,686 | 3/1987 | Furlani | 119/51 R |
| 4,765,277 | 8/1988 | Bailey et al. | 119/51 R |
| 4,767,088 | 8/1988 | Fielder | 248/121 |
| 4,829,934 | 5/1989 | Blasbalg | 119/52 R |
| 4,846,111 | 7/1989 | Kilham | 119/57.9 |
| 4,966,098 | 10/1990 | Freeman | 119/52.2 |
| 4,996,947 | 3/1991 | Petrides | 119/57.7 |
| 5,048,461 | 9/1991 | Wessner | 119/52.3 |

Primary Examiner—John G. Weiss
Attorney, Agent, or Firm—Jacobson and Johnson

[57] ABSTRACT

A tube-shaped bird feeder with a tiltable perch which allows a person to control the maximum weight of a bird which can feed on the feeder by adjusting the counterweight attached to a tiltable perch. When a heavier bird alights on the perch, the perch swings down out of the way without closing the feeding openings. Once the bird flies away, the perch swings back into a feeding position so a lighter bird can alight and eat the seeds. In one embodiment a shield screens the birds view of the feeding opening. The feeders can be mounted individually or can be gang mounted on a post stand to permit multiple birds to eat at the feeder. A float located inside the feeder alerts an owner to the need to replenish the feeder.

3 Claims, 6 Drawing Sheets

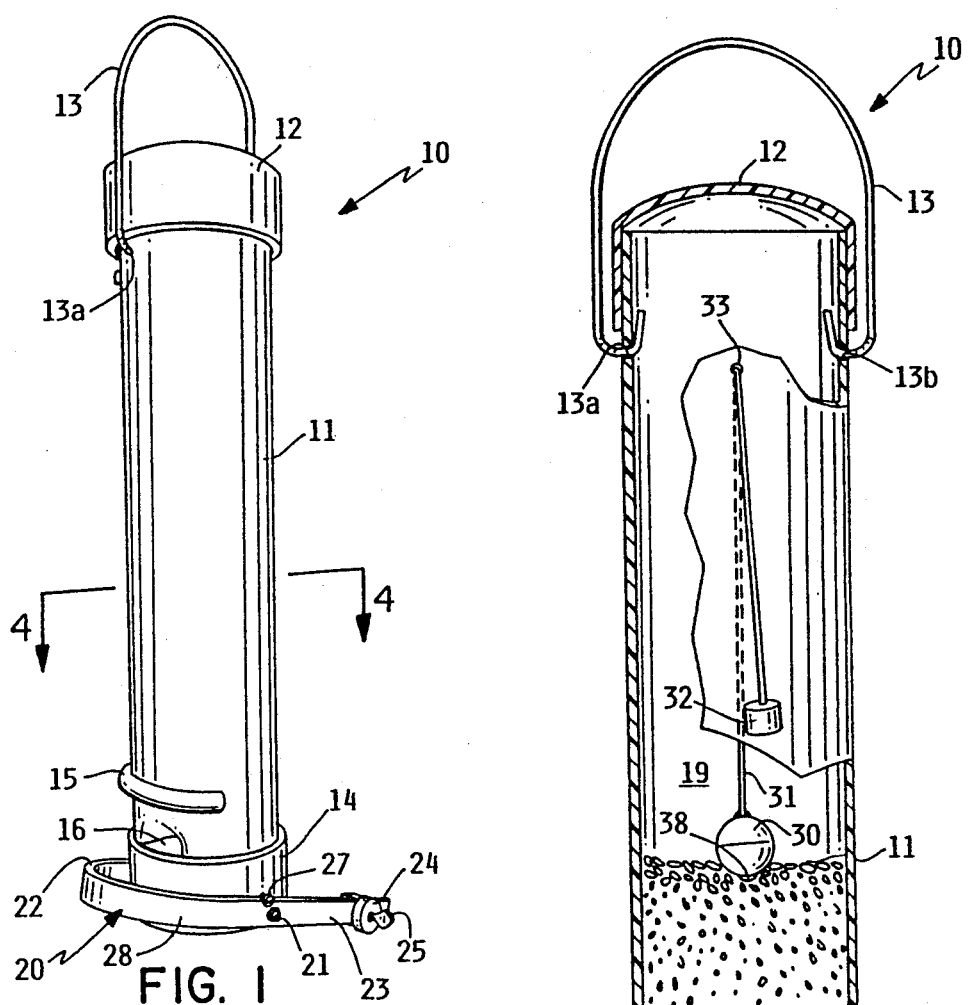
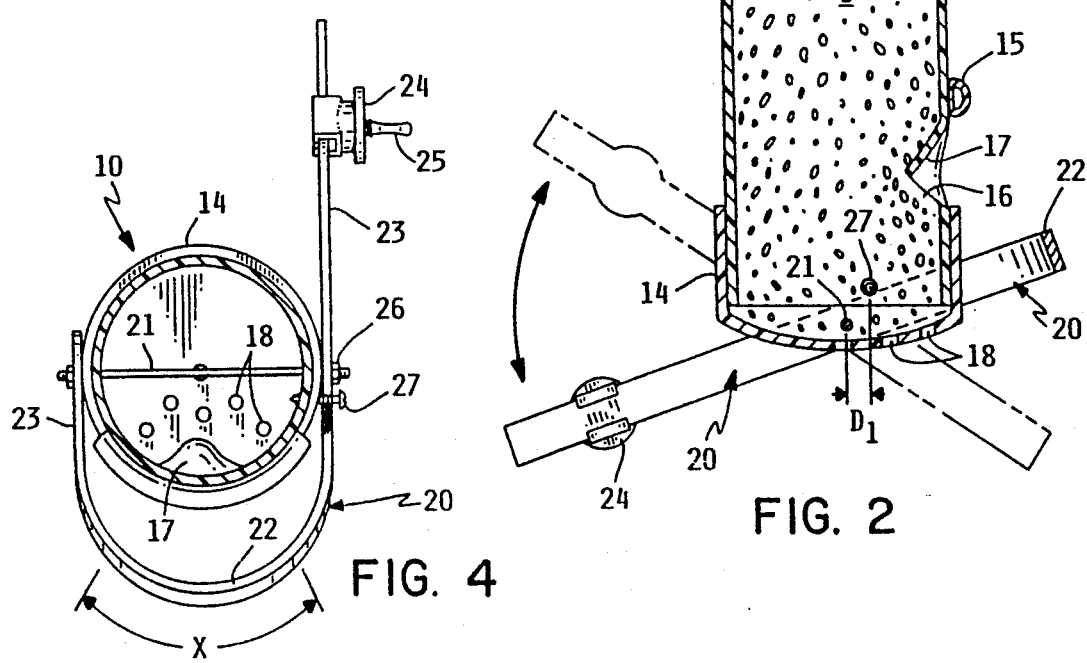
FIG. 1
FIG. 4
FIG. 2

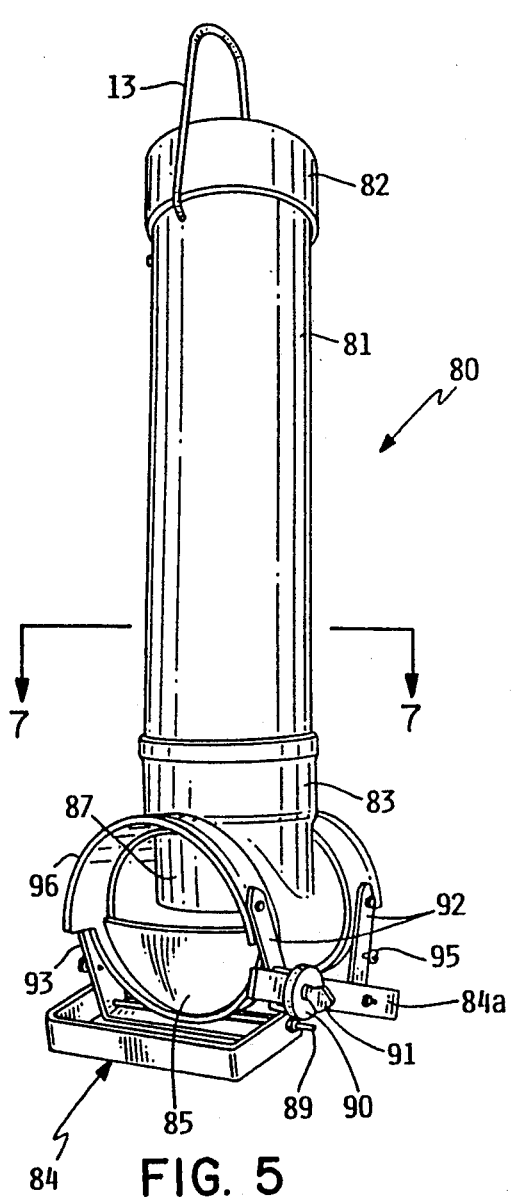
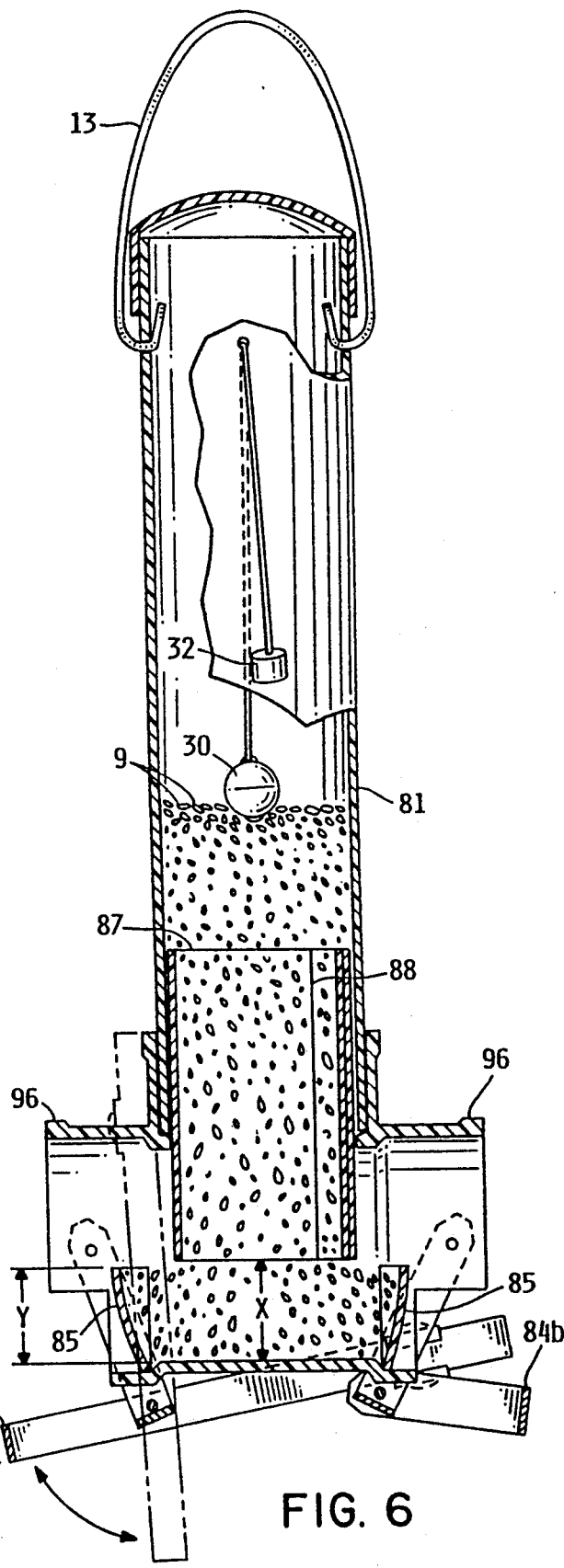
FIG. 5
FIG. 6

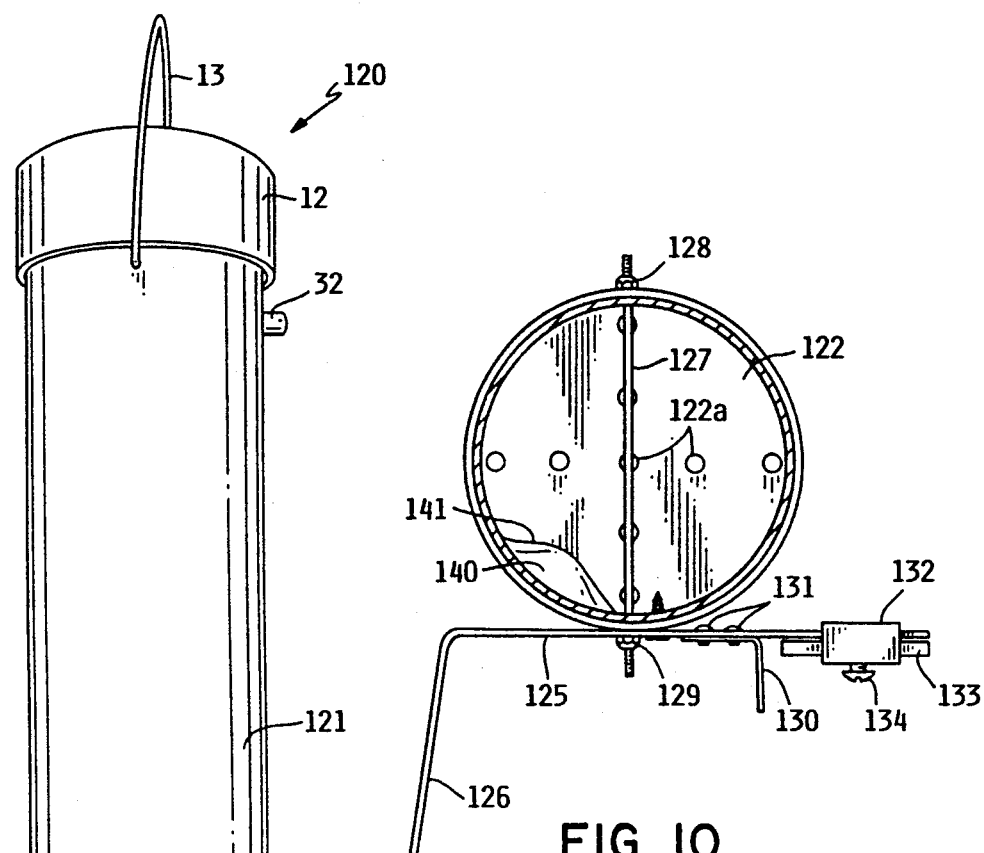
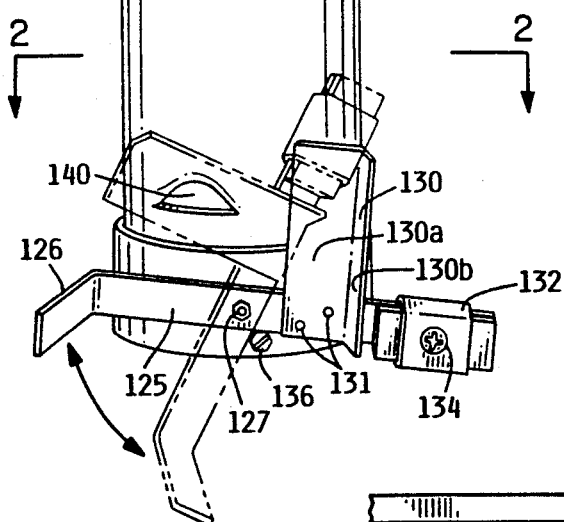
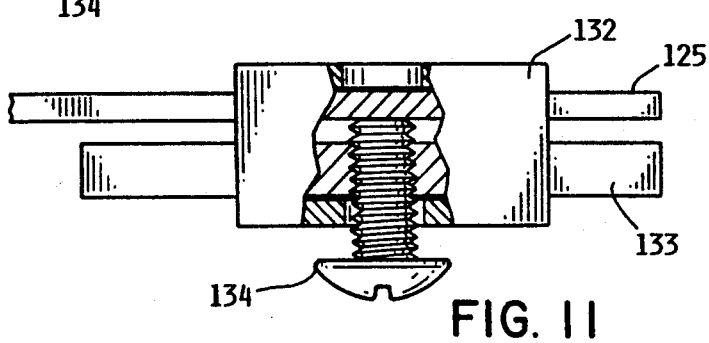
FIG. 10
FIG. 9
FIG. 11

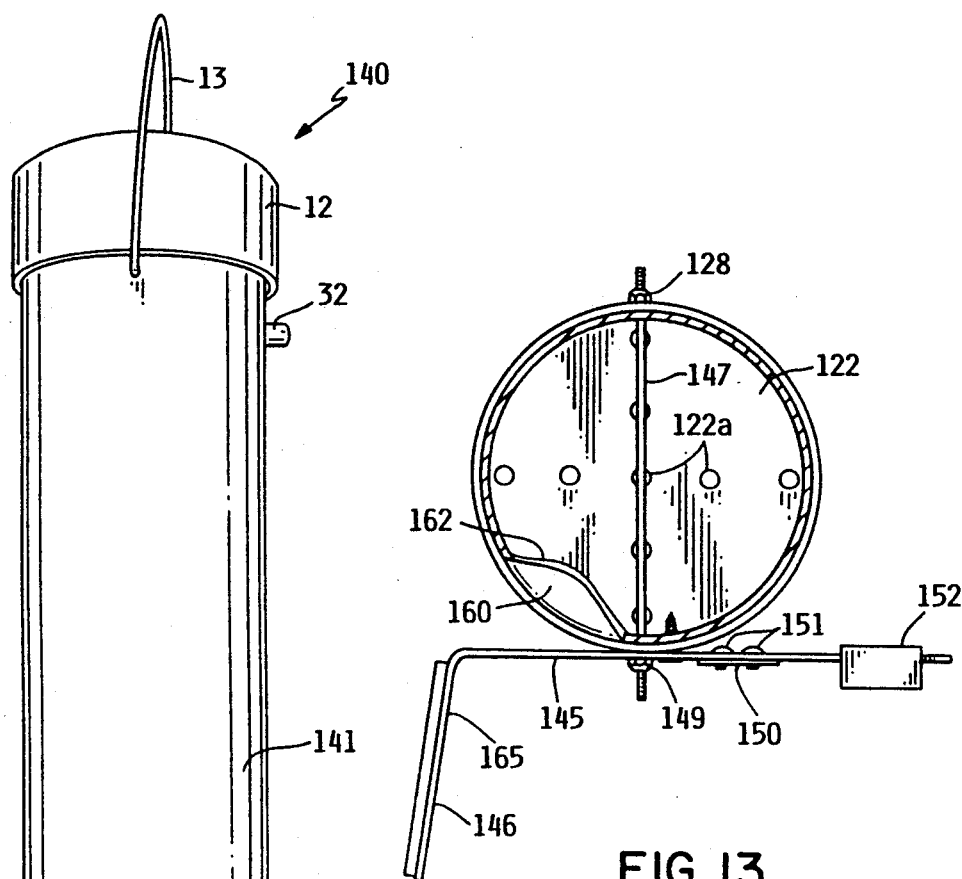
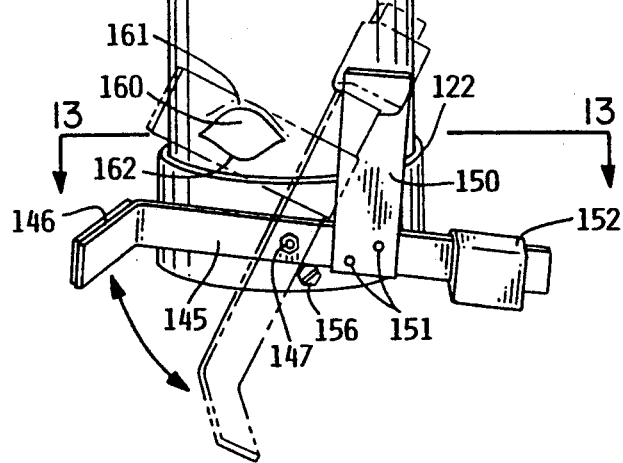
FIG. 12
FIG. 13

BIRD FEEDER

CROSS REFERENCE TO RELATED APPLICATIONS

This application is a continuation in part of my patent application Ser. No. 780,152 filed Oct. 21, 1991 pending which is a continuation in part of my patent application Ser. No. 718,963 filed Jun. 21, 1991 titled Bird Feeder now U.S. Pat. No. 5,105,765.

FIELD OF THE INVENTION

This invention relates generally to bird feeders, and more specifically, to positionable bird feeders for feeding song birds.

BACKGROUND OF THE INVENTION

One of the problem with bird feeders is that the more aggressive birds, such as jays and grackles, scare away smaller song birds. To prevent larger, more aggressive birds from using the feeders, they have been built with doors which close the feeding entrance when a bird alights on the feeding perch. Unfortunately, such doors may jam or freeze when exposed to winter conditions. Another disadvantage is that seeing whether the feeders are empty requires that the feeder be made of expensive, transparent materials. Still another problem with feeders is that they don't allow small birds to feed individually while keeping the larger, more aggressive birds from taking the bird seed from the smaller birds. The present invention provides an inexpensive bird feeder which works in all types of weather to selectively dispense bird seed to a single bird at each perch on the feeder.

DESCRIPTION OF THE PRIOR ART

U.S. Pat. No. 4,646,686 shows a bird feeder with a spring-loaded outer housing which moves downward to shut off the feeder opening if animals or heavier birds alight on it.

U.S. Pat. No. 4,327,669 shows a multiple bird feeder having multiple perches for a number of birds at a feeding station.

U.S. Pat. No. 4,328,765 shows a bird-feeder perch where the spacing between the wall and the perch is sufficiently small to permit only small birds access to the feeding opening in the feeder.

U.S. Pat. No. 4,498,423 shows a bird feeder which has a perch which can be moved in or out to accommodate different sized birds.

U.S. Pat. No. 2,965,070 shows a selective bird feeder which has a counterbalance weight which opens and closes a feeding door to prevent heavier birds from feeding.

U.S. Pat. No. 4,966,098 shows a game and pet feeder made from PVC pipe.

U.S. Pat. No. 4,829,934 shows a bird feeder with a post to permit mounting a feeder on top of a fence post.

U.S. Pat. No. 4,996,947 shows a goldfinch feeder which has a perch above the opening to allow goldfinches to feed upside down.

U.S. Pat. No. Des. 231,369 shows a see-through feeder with staggered feeding perches.

U.S. Pat. No. 2,677,816 shows a floating indicator which has a float located in the tank and a marker outside the tank to indicate the level of fluid in the tank.

U.S. Pat. No. 4,846,111 shows a wire coil perch that flexes and bends when a heavy bird sits on the perch.

U.S. Pat. No. 2,931,336 shows a plate that has a smaller opening that can be swung over the opening in the feeder.

BRIEF SUMMARY OF THE INVENTION

Briefly, the present invention comprises a bird feeder which allows a person to control the maximum weight of a bird which eats on the bird feeder by adjusting a counterweight attached to a tiltable perch. When a heavier bird alights on the perch, it swings down to a non-feeding position without closing the feeding openings. As the bird flies away, the perch swings back into the feeding position making the perch available for smaller birds to perch on and eat the seeds. The feeders can be mounted individually or can be gang mounted on a post stand to permit multiple birds to feed at the feeder. A float located inside the feeder alerts a person when the feeder should be replenished.

BRIEF DESCRIPTION OF THE DRAWINGS

FIG. 1 shows a perspective view of my single bird feeder;

FIG. 2 shows a partial sectional view of the bird feeder of FIG. 1 illustrating the tipping action of the perch;

FIG. 4 shows a cross-sectional view taken along lines 4—4 of FIG. 1;

FIG. 5 shows an alternate embodiment of my invention with two feeding stations;

FIG. 6 shows a partial cut away view of the feeder of FIG. 5;

FIG. 9 shows a perspective view of an alternate embodiment of my bird feeder;

FIG. 10 shows a cross-sectional view taken along line 10—10 of FIG. 9;

FIG. 11 shows a cutaway view of my positionable weight;

FIG. 12 shows a perspective view of an alternate embodiment of my bird feeder;

FIG. 13 shows a cross-sectional view taken along line 13—13 of FIG. 12.

DESCRIPTION OF THE PREFERRED EMBODIMENT

Figure 3:
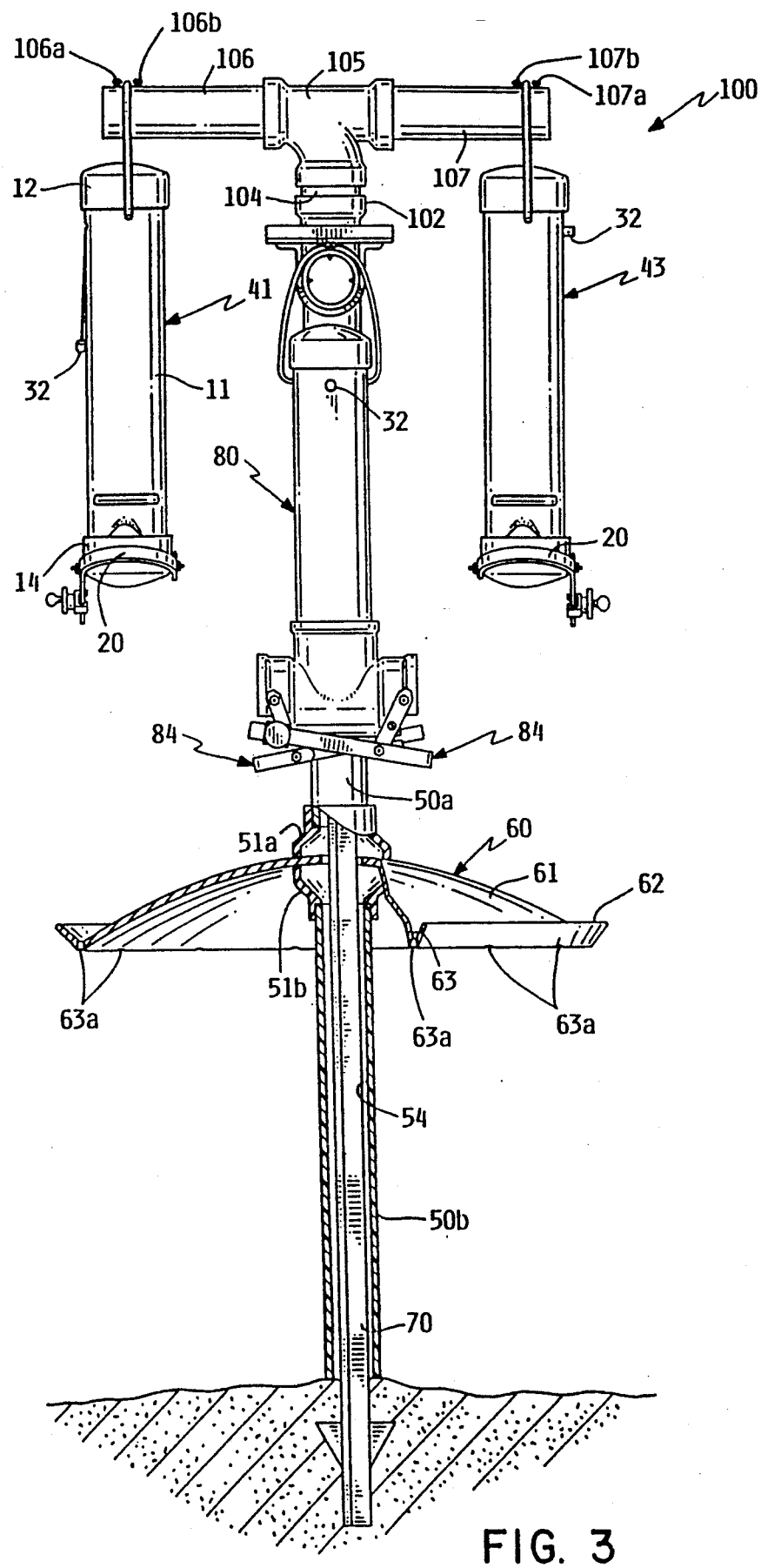
FIG. 3 illustrates my gang feeder mounted on a metal fence post.

FIGS. 1 and 2, reference numeral 10, generally identify my hanging individual small bird feeder made from a cylindrical section of four-inch diameter PVC pipe 11. A cap 12 is located on one end of pipe 11 and a similar cap 14 is located on the opposite end of pipe 11 to close the ends of the pipe and create a chamber 19 for holding bird seed. A U-shaped wire hanger 13 has one end extending through a first hole 13a on one side of pipe 11 and a second end extending through a second hole 13b on the other side of pipe 11 to permit the bird feeder to hang from a stand or a tree limb.

Located on the lower end of pipe 11 is a triangular-shaped opening 16 to permit a bird to peck and eat seed 9 in feeder 10. Triangular opening 16 is formed by heating and bending inward a portion of pipe to form an inside lip 17 to prevent bird seed from falling directly out of opening 16. Located immediately above opening 16 is a ledge 15 which extends across opening 16 to prevent rain from running down pipe 11 and into opening 16. Ledge 15 typically comprises a piece of tubing which is adhesively secured to the outside of pipe 11 to provide a ledge which conforms to the shape of pipe 11. Ledge 15 should extend out sufficiently far to direct rain away from opening. I have found a ⅛ inch wide ledge is sufficient to keep rain from running into the opening. If any rain should get into the opening, the holes 18 for chaff which are located at the bottom of the feeder permit the water to drain out.

Located on the lower portion of bird feeder 10 is a tiltable perch 20 which inhibits multiple birds from simultaneously eating at feeder 10. Tiltable perch has a J-shaped member 23 having a positionable weight 24 on one end and a curved bird perch 22 on the other end. The curved shape in the bird perch 22 follows the same general curvature as the outside of the housing 11 to provide a limited feeding region for the bird to perch on when eating from the feeder. That is, if the bird sits near fulcrum 21 of the perch, the bird cannot reach into opening 16 to peck at the bird seed 9.

FIG. 4 is a top view of the feeder showing the curved feeding region denoted by "x." The curved feeding region is located in front of opening 16 and defines the region where a song bird can perch and gain access to the seed in feeder 10. Because of the curvature of the housing and the curvature of the perch, there is only a limited area in front of the opening where a bird can gain access to the feeder. A further feature of perch 20 is that the top surface 22 has a relatively narrow width so that in colder climates, snow and ice does not accumulate and remain on the perch. I have found that a perch width of about ⅛ inch precludes snow and ice build-up on the perch. In the preferred embodiment, tiltable perch 20 is made of metal such as aluminum.

One of the features of my tiltable perch 20 is that the perch tilts down without closing off the opening if a larger bird such as a jay or grackle lands on the perch. For example, if a heavier bird such as a grackle alights on the perch, the proximity of the feeding region to the opening forces the bird to alight on the perch area 22. The heavier weight of the grackle forces tiltable perch 20 downward as viewed in FIG. 2. The downward motion not only scares the grackle away but moves perch 20 away from opening 16 to prevent the grackle from sitting on the tilted perch and reaching feeding opening 16.

FIG. 4 illustrates fulcrum 21 and comprises a pivot rod and nut 26 with the pivot rod extending across and through cap 14, housing 11 and J-shaped member 28 to hold cap 14 on housing, and also to provide a pivot support for tiltable perch 20. Typically, pivot rod 21 is made of brass so it will not corrode when exposed to the elements, thus ensuring that the tiltable perch will operate freely under all weather conditions. The positionable weight 24 is located at one end of tiltable perch 20 and includes a weight 24 having a U-shaped housing which extends partially and loosely around member 23 to allow positioning of the weight to provide the proper counterbalance weight for a small bird. A thumbscrew 25 fastens through threads in weight 24 to engage arm 23 to permit a person to lock weight 24 in any position along arm 23; and, consequently, determine the maximum weight of a bird which can feed on the feeding region of tiltable perch 20 without tilting the perch. That is, by positioning member 24 along cantilevered member 23, the owner can control the amount of weight which tips tiltable perch 20 between up and down positions (dotted lines) as illustrated in FIG. 2.

The cutaway in FIG. 2 illustrates perch 20 in the up position where a stop 27 prevents the perch from tilting further toward the feeder. Stop 27 is strategically placed with respect to fulcrum 21 to prevent the perch from getting hung up in the down position. That is stop 27 prevents the perch from tilting upward to far but is also spaced so that when the perch 20 swings down the Distance $D_1$ is sufficiently great so that the end with weight 24 will not rotate to or past a vertical line through fulcrum 21. Consequently, there is a component of force that will swing the feeder perch 20 back to the position shown in FIG. 1.

FIGS. 1 and 2 also illustrate that the opening 16 to the feeder 10 always remains open, even though the perch 20 may tilt from a feeding to a non-feeding position. That is, by eliminating any sliding door over the opening 16, an owner eliminates the problem of doors sticking in colder climates. Also, a curved perch which follows the shape of the feeder prevents birds from sitting on the portion of the perch closer to the pivot pin and feeding on the seed. That is, the side spacing is too close to the feeder to permit a bird to both perch and reach into opening 16. Consequently, if a heavier bird attempts to perch closer to the fulcrum to avoid tilting the perch, the bird can not reach the feeding opening 16.

In operation of my feeder, a song bird may alight on perch 22 and, since there is sufficient room for only one bird to eat from opening 16, the bird can eat by itself. If a larger bird, for example, a blue jay, chases away the song bird, the blue jay perching on perch 22 tilts the perch downward, scaring away the blue jay and preventing it from gaining access to bird seed in the feeder 11.

FIG. 2 shows my remote indicator for indicating the level of bird seed remaining in my feeder, I include a fishing float 30 with a weight 38 which rests on top of bird seed 9. A string 31 connects to float 30 and to a colored weight 32 located on the outside of the feeder. String 31 passes freely through an opening 33 in the side of the feeder 10. The feeder float 30 and weight 38 are heavier than weight 32, so that as the level of bird seed 9 in feeder 10 decreases, the float 30 follows the level of the bird seed. Float 30 follows the level of the seed causing indicator 32 on the outside of pipe 11 to rise toward the top of the feeder to alert the user to the fact that the feeder needs refilling. I have found that a ⅜-inch diameter fishing float remains on top of bird seeds such as sunflower seeds.

Another feature of my invention is that my bird feeder can be mounted in gang fashion on a post stand. FIG. 3 shows my gang feeder with two single bird feeders 41 and 43 and a double bird feeder 80 suspended from horizontally extending cross arms located on a post-mounted stand 100. My stand and cross arms are also formed of a rigid pipe such as PVC pipe. Stand 100 comprises a top rigid tubing 50a and a lower rigid tubing 50b. Tubing 50a and 50b have an interior region 54 for fitting around and completely covering a metal fence post 70 located in the ground. Note pipe 50b extends down to the ground and covers the lower portion of post 70. Post 70 also extends upward into pipe 50a and is concealed by pipe 50a. The coaction of pipes 50a and 50b with post 70 holds pipes 50a and 50b in vertical alignment with each other. Located on one end of pipe 50b is a reducing collar 51b and similarly located on the lower end of pipe 50a is a reducing collar 51a. The reducing collars 51a and 51b have the larger portion in contact with a domed saucer 60 to sandwich the domed saucer 60 therebetween. That is the weight of the hanging feeders is transferred to collar 51a to sandwich and hold saucer 60 in position. While pipe 50a and 50b are shown as one section it is possible to make the stand to break down further by using collars to hold shorter pieces of rigid tubing in alignment with each other. The sandwich of saucer 60 permits one to remove the top portion of the stand for shipping. That is the stand can be disassemble by merely lifting pipe 50a from around post 70.

One of the advantages of having the vertical pipe 50a and 50b formed in two parts is that it permits one to rotate the top portion of the feeder so that a person can gain access to the feeder from one side. For example, if there was a sidewalk next to the feeder the operator could rotate and place feed into all the feeders by merely rotating the feeder to one side. Another advantage is that it permits one to disassemble the stand for shipment. A further advantage is that it allows one to clean the tray 60 by removing the top portion of the stand 70.

Saucer 60 has a domed shape 61 which directs spilled seed from the hanging bird feeders into an annular trough 63 located around the periphery of saucer 60. That is, as the small birds feed on the individual feeder, the individual feeders are located over saucer 60 so the spilled bird seed falls onto the domed section 61 which directs the seeds down to trough 63 next to annular lip 62. Thus, spilled seeds can be used to feed other larger birds when song birds are not present. A series of small holes 63a located in trough 63 permit water to drain from trough 63 while retaining the larger seeds.

Figure 8:
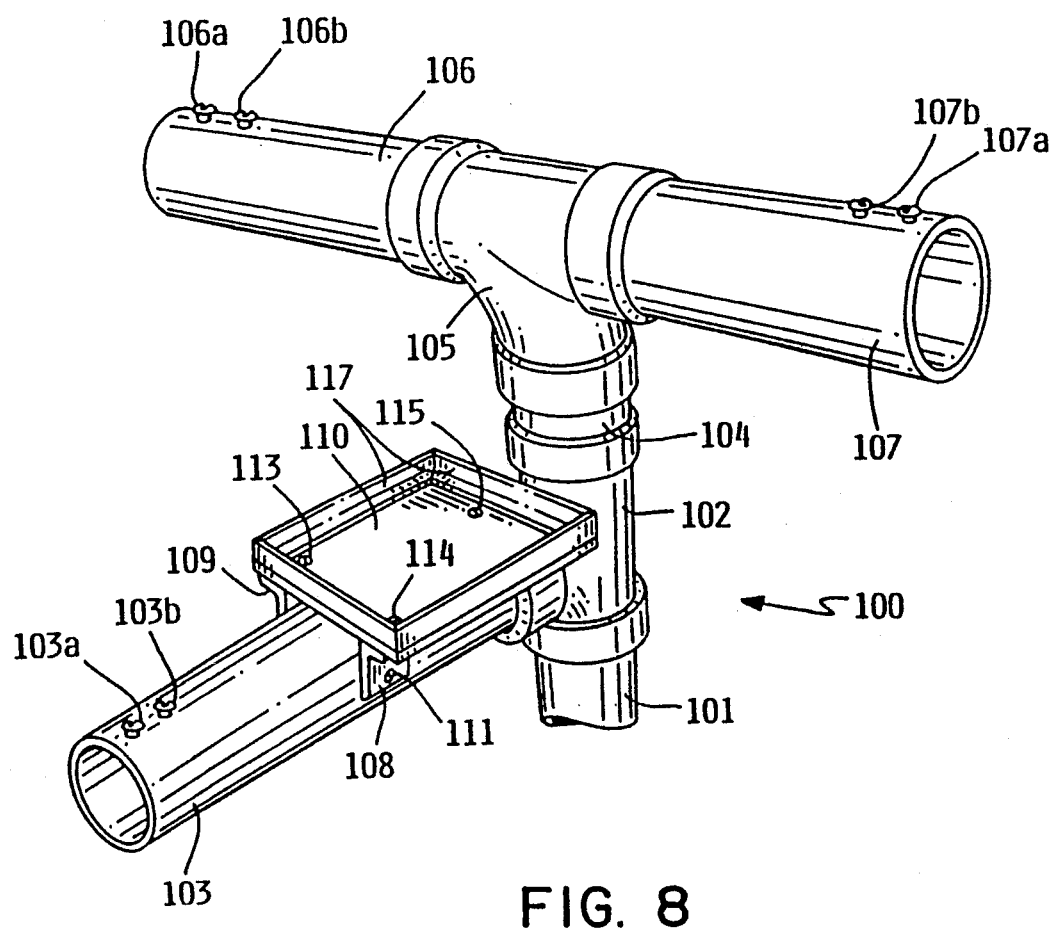
FIG. 8 shows a perspective view of the top portion of my stand.

FIG. 3 and FIG. 8 show the top portion of the stand 100 that holds the bird feeders in a hanging position. The top portion of stand 100 comprises a first tee 105 which has a first cross arm comprising a rigid pipe 106 extending out in one direction and an identical cross arm 107 extending out in the opposite direction. The screws 106a and 106b hold feeder 41 in position on cross arm 106. Similarly, screws 107a and 107b holds feeder 43 in position on cross arm 107. Extending downward from tee 105 is a pipe 104 that connects to a second tee 102. A pipe 103 extends horizontal out from tee 102 to provide a support for bird feeder 80. Pipe 103 contains screws 103a and 103b to hold feeder 80 in place.

Another feature of my invention is that I can also hold suet or the like by mounting a platform 110 on stand 100. Located on cross arm 103 is a right angle bracket 108 located on one side of pipe 103 and an identical right angle bracket 109 located on the opposite side of pipe 103 coact with the top of tee 102 holding platform 110 in a level position on top of my stand. Platform 110 is held in place by sheet metal screws 113, 114 and 115. A railing 117 extends around the edge of platform 110. Although suet can be held on plate 54, it could be equally be used to hold water so the gang feeder would provide both food and water. Thus, my gang feeder can not only selectively feed song birds but it can provide food to other birds as well.

FIG. 5, reference numeral 80 generally identifies my hanging two station bird feeder made from a cylindrical section of four-inch diameter rigid pipe 81, a rigid removable cap 82, and a rigid tee 83. Cap 82 is located on the top end of pipe 81 and T 83 is located on the opposite end of pipe 81 to provide feeding stations on opposite sides of the feeder. Since the feeding stations 41 and 43 are located on opposite sides of the feeder are identical, only feeding station 80 will be described.

The feeding station 80 comprises a tiltable perch 84 having an adjustable weight similar to that shown in feeder 10. A pivot rod 89 extends through supports 92 and 93 to hold the tiltable perch 84 in feeding position by the opening in tee 83. An adjustable weight 90 is held in position along arm 84a to permit a person to adjust the weight so that birds of limited weight can sit and feed on tiltable perch 84. A screw 95 acts as a stop to limit the motion of the tiltable perch. It should be noted that the two tiltable perches 84 can tip and operate independently of each other since each has a separate adjustable weight. Perch 84 has a straight feeding region for a bird to sit on. The hood 96 limits the access of the bird to the feeder since hood 96 projects perpendicularly outward from pipe 81 to also form a cover over the feeding area to keep out rain and snow. Located inside tee 83 is a curved baffle comprising a semi-circular insert 85 which prevents seed from falling out of the feeder.

Located within pipe 81 is a cylindrical split insert 87. Split insert 87 is typically made of the same diameter rigid pipe used in tube 81 except the pipe has been split longitudinally 88 which permits one to overlap the edges of the pipe and insert it in tube 81. That is even though the pipe is rigid when split it has sufficient resiliency to allow overlapping the edges of the pipe. The split pipe can be inserted inside tubing 87 to causes it to frictionally engage the inside diameter of pipe 81 and remain in place. The split pipe or split collar 87 can be moved up or down and is spaced a dimension "X" from the bottom to limit the level of feed in the feeder; that is, by lowering the split collar 87, one can control the level of seed available in the feeding region behind baffle 85. While X indicates the dimension the bottom of the split collar above the bottom of the feeder the inserts 85 are extended up a distance "Y" to act as a barrier to prevent seed such as sunflower seed from flowing out the end of the tee.

FIG. 6 illustrates how tiltable perch 84 swings out of the way to move the bird away from the feeding region without closing the feeding area in the feeder. Note, the operation of the tiltable perches are independent of one another.

Figure 7:
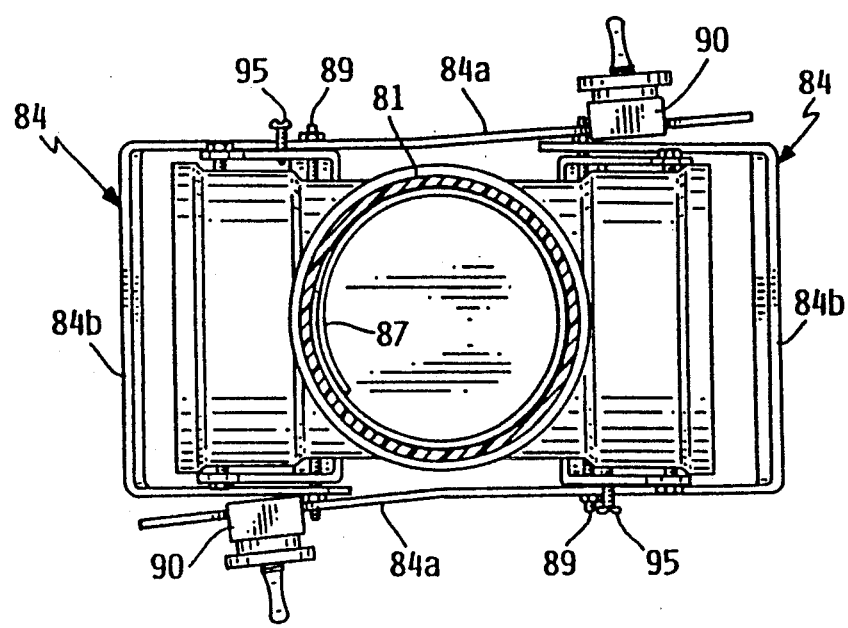
FIG. 7 shows a cross-sectional view taken along line 7—7 of FIG. 5.

FIG. 7 shows a top sectional view of the feeder illustrating the two bird feeding perches 84 located in a non interfering relationship with each other as well as the split collar insert 87 located within pipe 81.

In order to hold the pipes in my bird stand in the position shown I use the conventional adhesive that is used to secure or bond rigid pipes to each other with tees or collars.

Referring to FIGS. 9 and 10, reference numeral 120, generally identifies an alternate embodiment of my hanging individual small bird feeder made from a cylindrical section of four-inch diameter PVC pipe 121. The feeder of FIG. 9 is similar to the feeder of FIG. 9 and like parts have identical numbers. A removable cap 12 is located on one end of pipe 121 and a similar cap 122 is secured on the opposite end of pipe 121 to close the ends of the pipe and create a chamber for holding bird seed. To fill pipe 121 a user simply removes cap 12 and pours the bird seed in pipe 121. A U-shaped wire hanger 13 has one end extending through a first hole on one side of pipe 121 and and a second end extending through a second hole on the other side of pipe 121 to permit the bird feeder to hang from a stand or a tree limb. Preferably hanger 13 is made from a non corroding metal such as brass or aluminum. A float is located in the feeder with a visual indicator 32 attached thereto to provide a visual indication of the amount of bird seed in the feeder.

Located on the lower end of pipe 121 and proximate to pivot pin 127 is a triangular-shaped feeding opening 140 to permit a bird to peck and eat seed in feeder 120. Feeding opening 140 can be formed by heating and bending inward a portion of pipe to form lips to prevent bird seed from falling directly out of opening 140. I have found that the rain generally runs down pipe 121 and over feeding opening 140. Opening 140 is a curved opening with the opening being sufficiently small so that only one bird can feed at a time with curved opening 140 having an inward protruding upper lip 141b and an inward protruding lower lip 141a to direct rainwater over curved opening 140. If any rain should get into feeding opening 140, the holes 122a for chaff which are located at the bottom of the feeder permit the rainwater to drain out.

Located on the lower portion of bird feeder 120 is an L-shaped tiltable perch comprising a first perch member 125 that extends substantially tangentially away from feeder 120 and a second perch member 126 which extends substantially radially away from feeder 120. Members 125 and 126 inhibit larger birds eating at feeder 10. The two position tiltable perch has a straight solid unitary member 125 having a positionable weight 132 on one end and a straight solid unitary member 126 extending substantially perpendicular from the other end of member 125. The perch members 125 and 126 are positioned proximate to the feeding opening 140 to permit a bird to perch thereon when eating seed from feeding opening 140. Perch members 125 and 126 are solid non coil members that are positioned to provide different regions for a bird to perch on without pinching the birds feet. That is smaller birds can perch closer to feeding opening 140 by sitting on member 125 and larger birds can perch further away from opening 140 by sitting on member 16, however, if the bird is too heavy the perch tilts counterclockwise as shown in dotted lines in FIG. 9 thus preventing the larger birds from eating from the feeder. The L shaped tiltable perch of feeder 120 is similar to the tiltable perch of FIG. 1 in that a single pivot member 127 extends through cap 122 and housing 121 to provide a pivot for the tiltable perch. Lock nuts 128 and 129 hold the perch in a tiltable position. A two way stop comprising a screw 136 is located below member 125. FIG. 9 shows that when the perch is in the up position (solid lines) screw 136 acts as a stop to prevent counter weight 132 from tilting the perch clockwise. Likewise when a heavy and undesirable bird sits on member 126 the screw 136 acts as a stop to limit counterclockwise tilting of tiltable perch (phantom lines).

The tiltable perch of feeder 120 differs from the tiltable perch of FIG. 1 in that the tiltable perch of FIG. 9 includes a perpendicularly extending L-shaped shield 130 comprising a first member 130b and a second member 130a that is held on member 125 by rivets 131. The shield 130 extends upward and is spaced from feeding opening 140 when the tiltable perch is in the feeding position. When the tiltable perch is tilted downward shield 130 visually shields feeding opening 140 from a bird or a squirrel that may still be sitting on member 126. That is, while feeding opening 140 to the feeder is not closed off by shield 130 the proximity of shield 130 to an animal or bird sitting on the tiltable perch when the tiltable perch is in the down position causes the bird or animal to be visually shield from the feeding region in the vertical direction by member 130a and in the horizontal direction by member 130b.

FIG. 11 shows in greater detail the positionable weight comprising a housing 132 with a screw 134 that extends through the housing to hold weight 133 in position on member 125.

Referring to FIGS. 12 and 13, reference numeral 140, generally identifies an alternate embodiment of my hanging individual small bird feeder made from a cylindrical section of four-inch diameter PV pipe 141. The feeder of FIG.12 is similar to the feeder of FIG. 9 and like parts have identical numbers. A removable cap 12 is located on one end of pipe 141 and a similar cap 122 is secured on the opposite end of pipe 141 to close the ends of the pipe and create a chamber for holding bird seed. To fill pipe 141 a user simply removes cap 12 and pours the bird seed in pipe 141. A U-shaped wire hanger 13 has one end extending through a first hole on one side of pipe 141 and a second end extending through a second hole on the other side of pipe 141 to permit the bird feeder to hang from a stand or a tree limb. Preferably hanger 13 is made from a non corroding metal such as brass or aluminum. A float is located in the feeder with a visual indicator 32 attached thereto to provide a visual indication of the amount of bird seed in the feeder.

Located on the lower end of pipe 121 and proximate to pivot pin 147 in a mouth-shaped feeding opening 160 to permit a bird to peck and eat seed in feeder 140. Feeding opening 160 can be formed by heating and bending inward a portion of pipe to form a top inside protruding lip 161 and a bottom inside protruding lip 162 to prevent bird seed from falling directly out of opening 160. I have found that the rain generally runs down pipe 141 and over feeding opening 160. If any rain should get into feeding opening 160, the holes 122a for chaff which are located at the bottom of the feeder permit the rainwater to drain out.

Located on the lower portion of bird feeder 140 is an L-shaped tiltable perch 165 comprising a first perch member 145 that extends substantially tangentially away from feeder 140 and a second perch member 146 which extends substantially radially away from feeder 140. Members 145 and 146 inhibit larger birds eating at feeder 140. The two position tiltable perch 165 has a straight solid unitary member 145 having a positionable weight 152 on one end and a straight solid unitary perch member 146 extending substantially perpendicular from the other end of member 145. The perch members 145 and 146 are positioned proximate to the feeding opening 160 to permit a bird to perch thereon when eating seed from feeding opening 160. Perch members 145 and 146 are solid non coil members that are positioned to provide different regions for a bird to perch on without pinching the birds feet. That is smaller birds can perch closer to feeding opening 160 by sitting on member 145 and larger birds can perch further away from opening 160 by sitting on member 146, however, if the bird is too heavy perch 165 tilts counterclockwise as shown in dotted lines in FIG. 12 thus preventing the larger birds from eating from the feeder. The L shaped tiltable perch of feeder 120 is similar to the tiltable perch of FIG. 1 and FIG. 9 in that a single pivot member 147 extends through cap 122 and housing 141 to provide a pivot for the tiltable perch. Lock nuts 128 and 149 hold the perch in a tiltable position. A two way stop, comprising a screw 156 is located below member 145. FIG. 12 shows that when perch 165 is in the up position (solid lines) screw 156 acts as a stop to prevent counter weight 152 from tilting the perch clockwise. Likewise when a heavy and undesirable bird sits on member 146 the screw 156 acts as a stop to limit counterclockwise tilting of tiltable perch (phantom lines).

The tiltable perch of feeder 140 differs from the tiltable perch of FIG. 1 and FIG. 9 in that the tiltable perch of FIG. 12 includes a perpendicularly extending rectangular-shaped shield 150 that is held on member 145 by rivets 151. The shield 150 extends upward and is spaced from feeding opening 160 when the tiltable perch is in the feeding position. When the tiltable perch is tilted downward shield 150 visually shields feeding opening 160 from a bird or a squirrel that may still be sitting on member 146. That is, while feeding opening 160 to the feeder is not closed off by shield 150 the proximity of shield 150 to an animal or bird sitting on the tiltable perch when the tiltable perch is in the down position causes the bird or animal to be visually shield from the feeding region in the vertical direction by shield 150.

I claim:

1. A hanging bird feeder for selectively allowing a bird to feed thereon, comprising:
   a cylindrical rigid tubing having an inside and an outside, said tubing having a first end and a second end;
   a first cap located on said first end to provide a cover to one end of said tubing; a second cap located on the other end of said tubing to provide a bottom to hold bird seed in said tubing, said tubing having a curved opening with said opening being sufficiently small so that only one bird can feed at a time, said curved opening having an inward protruding upper lip and an inward protruding lower lip to direct rainwater over said curved opening;
   a tiltable perch having a feeding position and a non-feeding position, said tiltable perch having a feeding region for a bird to sit on when eating bird seed from said curved opening, said perch having a cantilevered member extending therefrom, said perch having an edge sufficiently narrow to prevent snow and ice build-up;
   a pivot rod extending through said tubing said second cap and said tiltable perch to permit said perch to tilt from the feeding position to the non-feeding position;
   a positionable weight located on said cantilevered member, said positionable weight allowing a person to limit the size of the bird which can feed from said tiltable perch without tipping said perch from the feeding position to the non-feeding position;
   a stop to hold said perch in the feeding position; and
   a bird seed level indicator, said level indicator moves in response to the level of bird seed, said bird seed level indicator including a float that remains on top of the bird seed, a string extending through an opening in said tubing, said string having a first end and a second end, said float connected to one end of the string and a visual indicator located on the outside of said tubing and attached to the other end of the string so that as the level of the bird seed falls in said tubing the visual indicator alerts a person to the need to replenish the bird seed.

2. A hanging bird feeder for selectively allowing a bird to feed thereon, comprising:
   a cylindrical rigid tubing having an inside and an outside, said tubing having a first end and a second end;
   a first cap located on said first end to provide a cover to one end of said tubing; a second cap located on the other end of said tubing to provide a bottom to hold bird seed in said tubing, said tubing having a curved opening with said opening being sufficiently small so that only one bird can feed at a time, said curved opening having an inward protruding upper lip and an inward protruding lower lip to direct rainwater over said curved opening;
   a tiltable perch having a feeding position and a non-feeding position, said tiltable perch having a feeding region for a bird to sit on when eating bird seed from said curved opening, said perch having a cantilevered member extending therefrom;
   a pivot rod extending through said tubing, said second cap and said tiltable perch to permit said perch to tilt from the feeding position to the non-feeding position;
   a positionable weight located on said cantilevered member, said positionable weight allowing a person to limit the size of the bird which can feed from said tiltable perch without tipping said perch from the feeding position to the non-feeding position;
   a shield located on said cantilevered member, said shield extending upward therefrom to screen a bird or animal sitting on said tiltable perch in the non-feeding position to thereby hinder the bird or animal from seeing the curved opening in said bird feeder;
   a stop to hold said perch in the feeding position; and
   a bird seed level indicator, to alert a person that the level of the bird seed has fallen and needs refilling.

3. The bird feeder of claim 2 wherein said tiltable perch includes a rectangular-shape with a portion of said tiltable perch extending radially away from said bird feeder.

* * * * *